US006980698B2

(12) United States Patent
Eschbach et al.

(10) Patent No.: US 6,980,698 B2
(45) Date of Patent: Dec. 27, 2005

(54) IMAGE FINDER METHOD AND APPARATUS FOR PIXOGRAPHY AND OTHER PHOTO-RELATED REPRODUCTION APPLICATIONS

(75) Inventors: Reiner Eschbach, Webster, NY (US); Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 704 days.

(21) Appl. No.: 10/200,238

(22) Filed: Jul. 22, 2002

(65) Prior Publication Data

US 2004/0013317 A1 Jan. 22, 2004

(51) Int. Cl.[7] ............................ G06K 9/64; G06F 17/30
(52) U.S. Cl. ........................... 382/278; 382/305; 707/1
(58) Field of Search ................................ 382/100, 173, 382/218, 278, 305; 707/1, 8, 100, 104.1, 707/203, 205; 714/21

(56) References Cited

U.S. PATENT DOCUMENTS

| | | | | |
|---|---|---|---|---|
| 5,155,849 | A | * | 10/1992 | Westfall et al. ............. 707/203 |
| 5,838,831 | A | | 11/1998 | de Queiroz ................. 382/248 |
| 6,094,654 | A | * | 7/2000 | Van Huben et al. ............ 707/8 |
| 6,240,527 | B1 | * | 5/2001 | Schneider et al. ............ 714/21 |
| 6,330,572 | B1 | * | 12/2001 | Sitka .......................... 707/205 |
| 6,374,260 | B1 | * | 4/2002 | Hoffert et al. ........... 707/104.1 |
| 6,583,852 | B2 | * | 6/2003 | Baum et al. .................... 355/40 |
| 6,589,721 | B1 | * | 7/2003 | Arcus et al. ................. 430/435 |
| 6,757,698 | B2 | * | 6/2004 | McBride et al. ............ 707/204 |
| 6,829,611 | B2 | * | 12/2004 | Majewski et al. ............ 707/10 |

OTHER PUBLICATIONS

G. Ciocca, R. Schettini, L. Cinque, *Image Indexing and Retrieval Using Spatial Chronomatic Histograms and Signatures* CGIV '2002:First European Conference on Color in Graphics, Image and Vision, Apr. 2-5, 2002.
G. Ciocca, D. Marini, A. Rizzi, R. Schettini, S. Zuffi, *Color Based Image Retrieval of Uncalibrated Images* Proceedings of IEEE on Content-Based Multimedia Indexing, Brescia, pp. 199-206, 2001.
R. Schettini, G. Ciocca, S. Zuffi, *A Survey of Methods for Color Image Indexing and Retrieval in Image Databases* Instituto Technologie Informatiche Multimediali, (date unknown).

* cited by examiner

Primary Examiner—Kanjibhai Patel
(74) *Attorney, Agent, or Firm*—Fay, Sharpe, Fagan, Minnich & McKee, LLP

(57) ABSTRACT

An image finder method and apparatus are provided for identifying a source image data file in a database based upon a printed image actually generated from a source image data file in the database. Input image data that represent a printed input image are received from a scanner. Source image data are received from the database that is defined by a plurality of different source image data files stored on a CD-ROM or other storage medium. Correlation operations are carried out to identify any source image data files that are highly correlated with the input image data. The results of the correlation operations are used to identify the source image data file from which the input printed image was actually generated or, if this is not possible, to identify more than one source image data file that could be the source image data file from which the printed input image was actually generated. Both the input image data and source image data are severely subsampled to obtain no more than about 1000 (and most preferably no more than 200) data values from each set of data for use in the correlation operation to provide for extremely fast processing without loss of accuracy.

20 Claims, 3 Drawing Sheets

IMAGE FINDER METHOD AND APPARATUS FOR PIXOGRAPHY AND OTHER PHOTO-RELATED REPRODUCTION APPLICATIONS

BACKGROUND OF THE INVENTION

The present invention relates to digital image processing. More particularly, the present invention relates to a method and apparatus for quickly and efficiently locating a source digital image data file from a large database of source digital image data files based upon a printed input image generated from the desired source image data file. The present invention finds particular application in pixography applications and image reproduction applications such as electrophotographic reproduction apparatus and methods.

The term "pixography" is commonly used to refer to a process involving searching for digital image data for purposes of viewing, distributing, printing or other processing. With the increased popularity of digital photography and digital image processing for photographic and document reproduction applications, a common difficulty encountered by users is the inability to locate the original or source digital image data from which a known printed image has been generated in a large-size digital image database. Digital image databases, whether stored on CD-ROM, magnetic disk drives or other storage media, can be extremely large. For example, one standard CD-ROM can be used to storage data representing at least 1000 high quality JPEG-compressed images. In such case, a user looking for a particular source image data file in the database would be required to actually review each image (or a thumbnail image derived therefrom) until the desired source image could be manually identified. Obviously, for pixography and other consumer oriented applications, this tasks is cumbersome and not likely to be completed. Thus, it is common for the user to scan the printed image as the input image to the pixography or other application, and this leads to image data degradation due to the second-generation reproduction.

Numerous digital image finder methods and apparatus are known. These have been found to be sub-optimal or entirely unsuited for use in applications where cost and complexity must be minimized while speed is maximized. For example, color based system are disclosed in the following documents: (1) G. Ciocca, R. Schettini, L. Conque, *Image Indexing and Retrieval using Spatial Chronomatic Histograms and Signatures,* CGIV '2002: First European Conference on Color in Graphics, Image and Vision, Apr. 2–5, 2002; (2) G. Ciocca, D. Marini, A. Rizzi, R. Schettini, S. Zuffi, *Color Based Image Retrieval of Uncalibrated Images,* Proceedings of IEEE on Content-Based Multimedia Indexing, Brescia, pp. 199–206, 2001; and, (3) R. Scheftini, G. Ciocca, S. Zuffi, *A Survey of Methods for Colour Image Indexing and Retrieval in Image Databases,* Instituto Tecnologie Infomatiche Multimediali (date unknown). Conventional image finder methods such as these and others are necessarily complex for at least the following reasons: (i) the input image to be located in the database is not known to be generated from data in the database; and/or (ii) error is highly undesired in conventional applications.

Based upon the foregoing and similar difficulties, it has been deemed desirable to provide an image finder method and apparatus for pixography and other photo-related reproduction applications that overcomes the foregoing difficulties and others. In particular, it has been deemed desirable to provide a method and apparatus for finding the source data file from which a particular printed image has been generated when the source data file is stored in a large database of source digital image data files.

SUMMARY OF THE INVENTION

In accordance with a first aspect of the present invention, a method for identifying a source image data file from which a printed image has been generated includes subsampling input image data to derive input correlation data values related to the printed image. Source image data are received that represent a source image data file stored in a source image database. The source image data are subsampled to obtain source correlation data values, and a correlation operation is performed between the input correlation values and the source correlation values to obtain a correlation result value (t). The source image data file of said source image database is identified as a match data file if the correlation result value (t) associated with the source image data file is greater than or equal to a select threshold.

In accordance with another aspect of the present invention, an electrophotographic or other document reproduction apparatus comprises means for identifying a source image data file from which a printed image has been generated. The means for identifying the source image data file comprise means for receiving input image data that represent a printed input image and means for subsampling the input image data to derive input correlation data values. Means are provided for receiving source image data that represent a source image data file stored in a source image database are provided. The apparatus further comprises means for subsampling the source image data to obtain source correlation data values and means for performing a correlation operation between the input correlation values and the source correlation values to obtain a correlation result value (t). The apparatus comprises means for identifying the source image data file of the source image database as a match data file if a correlation result value (t) associated with the source image data file is greater than or equal to a select threshold.

In accordance with another aspect of the present development, a digital image processing apparatus comprises means for receiving input image data that represent a printed input image and means for subsampling the input image data to derive input correlation data values. The apparatus also comprises means for receiving source image data that represent a source image data file stored in a source image database and means for subsampling the source image data to obtain source correlation data values. The apparatus further includes means for performing a correlation operation between the input correlation values and the source correlation values to obtain a correlation result value (t), and means for identifying the source image data file of said source image database as a match data file if a correlation result value (t) associated with the source image data file is greater than or equal to a select threshold.

BRIEF DESCRIPTION OF THE DRAWINGS

The present invention comprises various steps and arrangements of steps, and various components and arrangements of components, preferred embodiments of which are illustrated in the accompanying drawings that form a part hereof and wherein.

DETAILED DESCRIPTION OF PREFERRED EMBODIMENTS

Figure 1:
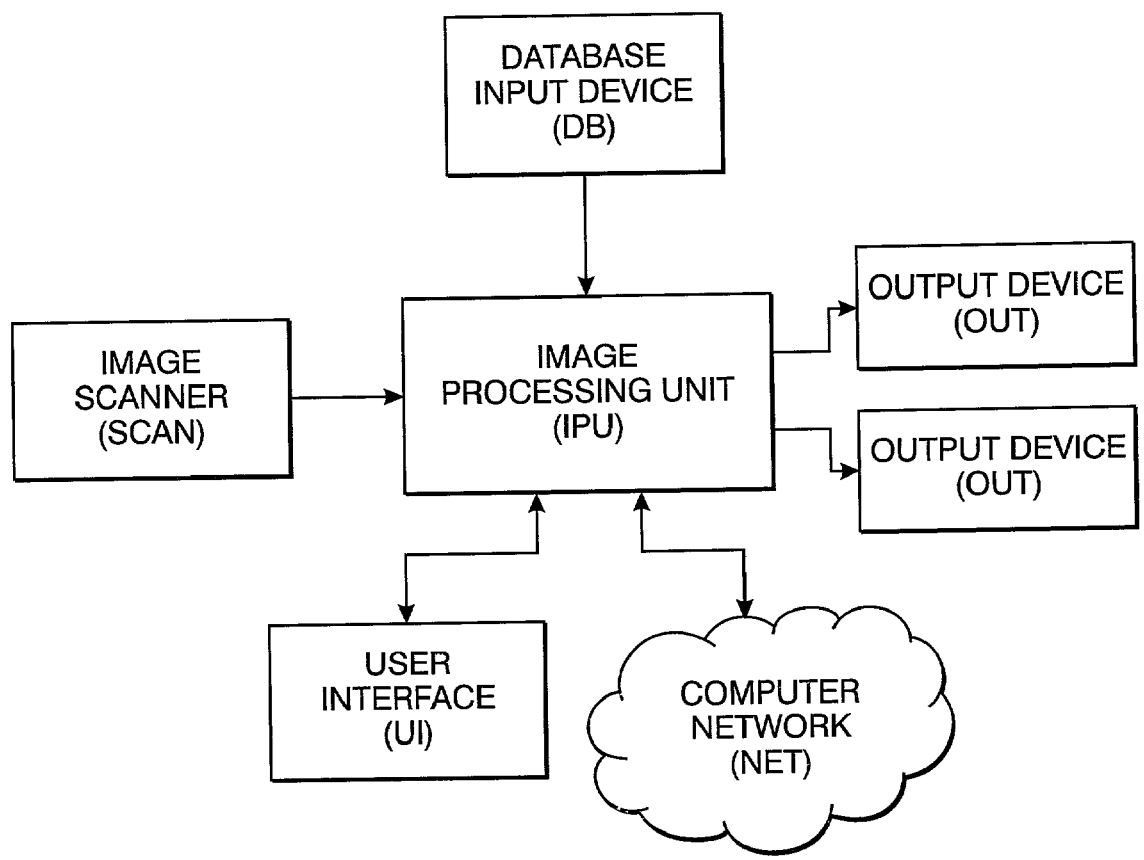
FIG. 1 diagrammatically illustrates a digital image processing apparatus formed in accordance with the present invention.

Referring now to the drawings, FIG. 1 diagrammatically illustrates an image reproduction apparatus for implementing the method and comprising an apparatus in accordance with the present invention. A digital image processing apparatus formed in accordance with the present invention comprises a image processing unit (IPU) for performing digital image processing and other electronic computational operations. The image processing unit IPU is operably coupled to an image scanner (SCAN) that receives an image as input and derives digital image data representative of the image as is well understood in the art. The term scanner as used herein is intended to encompass all devices that receive image data and derive digital image data therefrom. Examples of scanners include document scanners that receive printed images as input and digital cameras that receive optical images as input. The image processing unit (IPU) receives the digital image data from the scanner (SCAN) as input.

The image processing unit (IPU) is also operably coupled to one or more output devices (OUT) that receive digital image data from the image processing unit. The image output device(s) can comprise a digital data storage device that stores the digital image data for later retrieval (e.g., CD-ROM, magnetic media, or other storage medium), a video display terminal that generates a visual image based upon the digital image data, and/or a printer that generates a "hard copy" printed image based upon the digital image data.

As illustrated herein, the image processing unit (IPU) is optionally connected to a computer network (NET) such as a local area network, a wide area network, and/or a global computer network such as the internet. As such, the image processing unit (IPU) can send digital image data to and receive digital image data from any network(s) to which it is connected.

The image processing unit is also operably coupled to a digital image database input device (DB). This digital image database input device (DB) can be a simple fixed magnetic disk drive and/or removable magnetic disk, an optical media reader (e.g., a CD-ROM input device) that receives an optical storage medium, and/or any other suitable digital image data storage device that includes and/or is adapted to receive and read a digital image storage medium.

The apparatus of FIG. 1 further comprises a user interface (UI) operably coupled to the image processing unit. The user interface, which comprises any suitable input/output devices is used by a user to receive information from and input information to the image processing unit. Suitable user interface devices include keyboards/keypads, mechanical buttons/switches, video display terminals with graphical user interfaces, pointing devices such as a joystick or mouse, voice command input devices, touch screens and/or any other suitable input/output device by which a user can receive information from and input information to the image processing unit (IPU).

Those of ordinary skill in the art will recognize that it is possible for some overlap to exist in connection with the user interface (UI) and output device(s) (OUT). For example, a video display terminal or screen of the output device (OUT) can also be part of the user interface (UI) and provide visual information to the user.

Those of ordinary skill in the art will also recognize that an apparatus formed in accordance with FIG. 1, including the image processing unit (IPU) can be provided by a wide variety of know systems. For example, the apparatus of FIG. 1 can be provided by a conventional personal computer and conventional peripheral devices, a xerographic or electrophotographic digital image reproduction apparatus (i.e., a digital "copier"), a dedicated computing device such as a digital image processing kiosk or "pixography" station where a user can use the scanner (SCAN) and insert a CD-ROM or other storage medium into the database input device (DB) as required for image processing operations described below.

Unlike conventional apparatus, the apparatus illustrated in FIG. 1 is programmed to provide an image finder apparatus and method in accordance with the present invention. More particularly, as described with reference to FIGS. 2 and 3, the apparatus of FIG. 1 performs an image finder method whereby the source image data file from which a printed input image has been generated is located for use in additional image processing operations.

Figure 2:
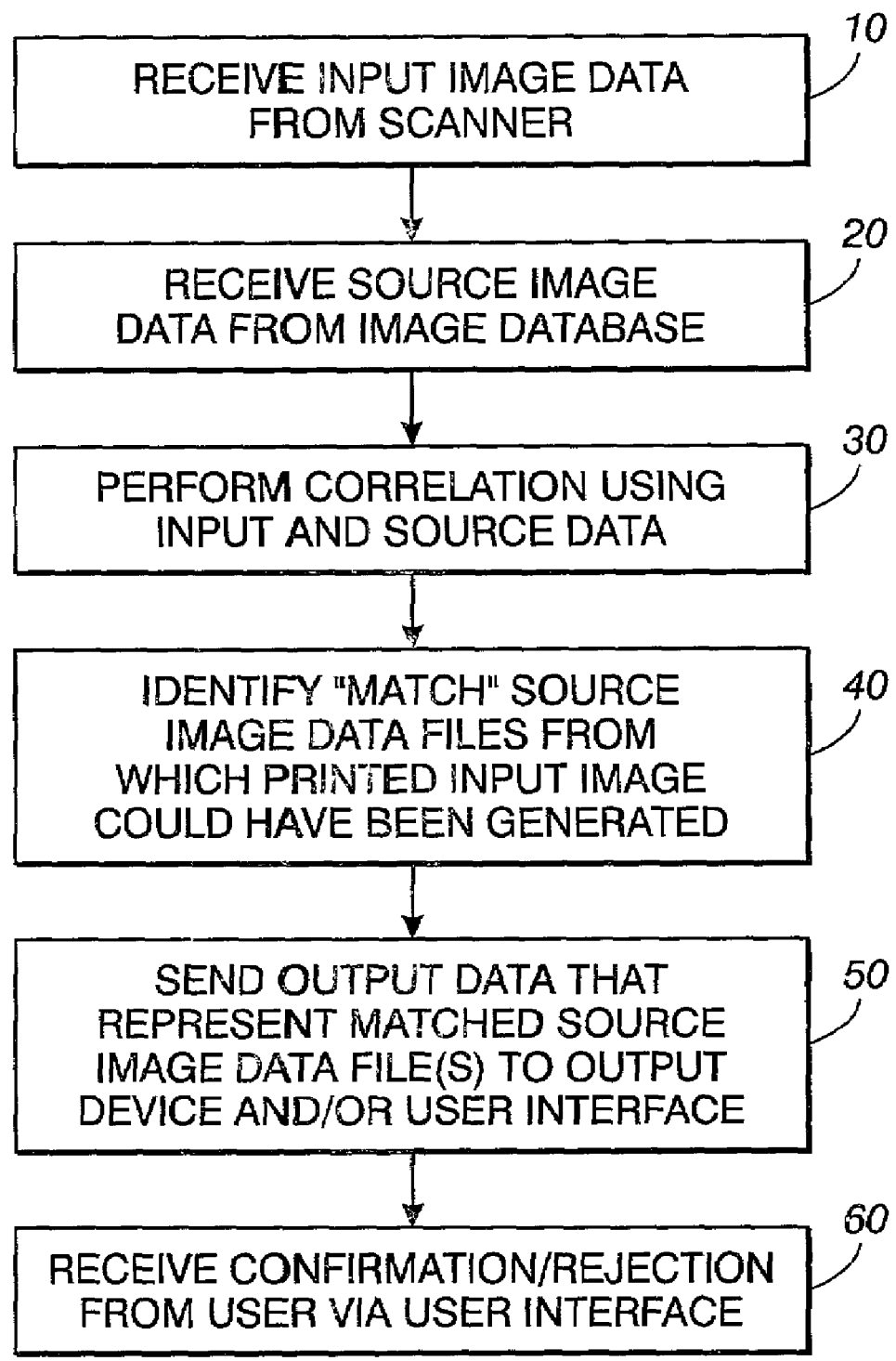
FIG. 2 is a flow chart that discloses an image finder method in accordance with the present invention; and, FIG. 3 is a flow chart that discloses aspects of the image finder process of FIG. 2 in further detail.

With particular reference now to FIG. 2, an image finder method in accordance with the present invention comprises a first step 10 of receiving input image data from the scanner (SCAN) into the image processing unit (IPU). This step 10 is typically carried out in connection with a user inputting a printed image into the scanner, where the user wants to locate the source digital image data file from which the printed image was generated when the source digital image data file is stored in a source image database.

A step 20 comprises using the database input device (DB) to receive source image data from a source image database defined by a plurality of different source image data files. In one example, the database input device (DB) is used to read a CD-ROM or other storage medium.

A step 30 is carried out in the image processing unit (IPU) to perform correlation or cross-correlation operations between the input image data received in step 10 and the source image data received from the database input device (DB) in step 20. The results of the correlation operations are used in a step 40 to identify the source image data file from which the input printed image was generated or, if this is not possible, to identify more than one source image data file that could be the source image data file from which the printed input image was generated. In other words, the correlation operation is carried out to match the input printed image to at least one source image data file. It is to be noted that the terms "correlation" and "cross-correlation" as used herein refer to any general mathematical comparison or matching operations and are not intended to be limited to specific mathematical equations or processes as defined herein or elsewhere.

In a step 50, the image processing unit sends output data to the output device (OUT) and/or the user interface (UI). The output data are representative of the one or more source image data files matched to the printed image by way of the correlation operations 30. Typically, in this step 50 the output data are sent from the image processing unit (IPU) to a video display terminal to generate a full image or a thumbnail or other visual image for review by a user so that the user can either: (i) confirm that the single matched source image data file is, in fact, the desired source data file; or, (ii) select the desired one of a plurality of different matched source image data files based upon the displayed output data that represent a plurality of different possible source image data files. In the first case, the user uses the user interface (UI) to accept or reject the identified source image data file while in the second case, the user interacts with the user interface (UI) to select the desired one of the plurality of different possible source image data files or rejects all of the different possible source image data files identified or matched through the correlation operation 30.

The step 60 comprises receiving input from the user indicating acceptance or rejection of at least one matched source image data file. After the step 60, further image processing (reproduction, enlargement, cropping, etc.) can be carried out as desired by the user in accordance with conventional methods.

Figure 3:
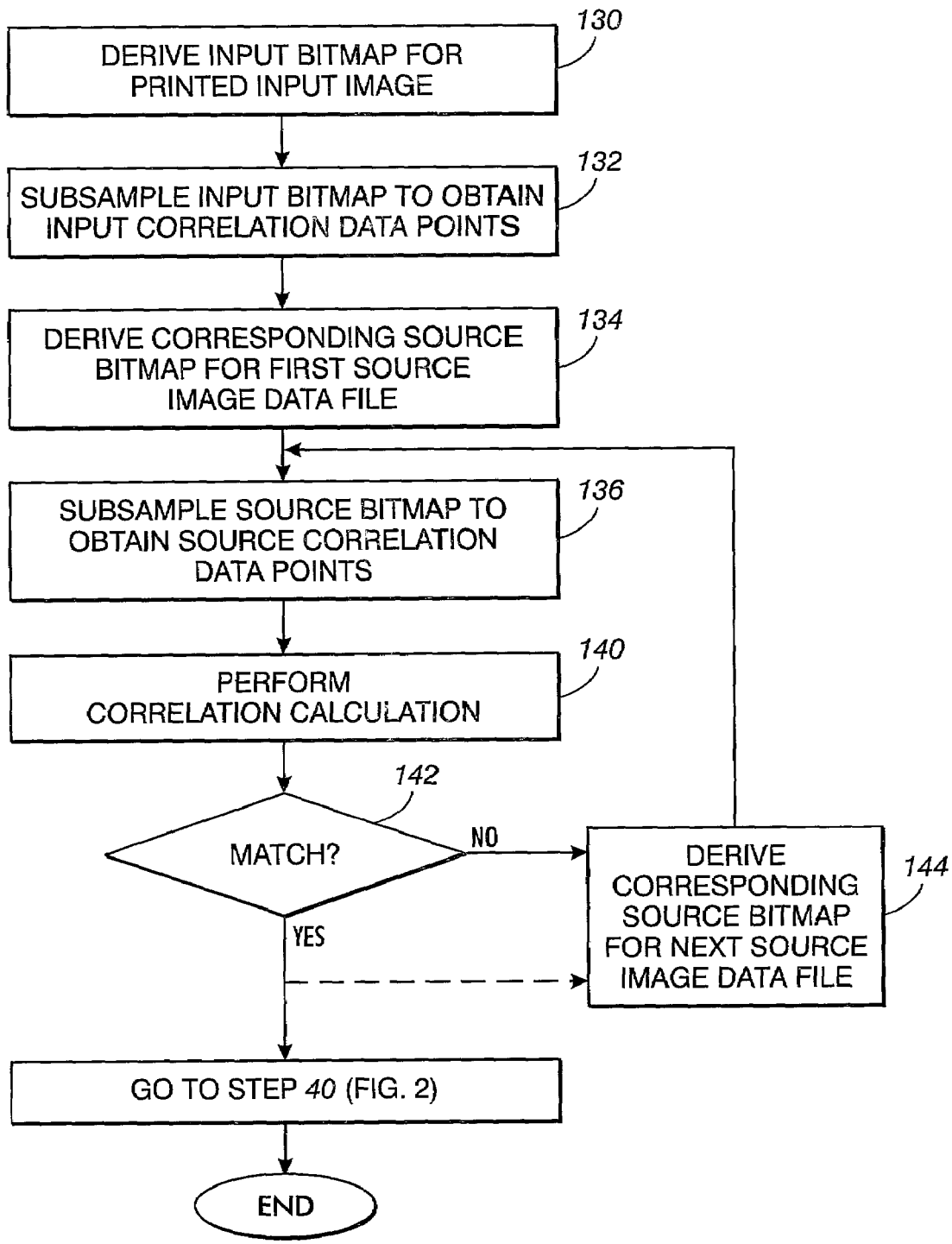

FIG. 3 discloses one embodiment of the correlation operations 30 in further detail. A step 130 comprises deriving an input bitmap that is representative of the printed input image by processing the input image data received from the scanner (of course, if the data are received from the scanner in bitmap form, this step is not required). In a step 132, the input bitmap is severely subsampled as described in further detail below to obtain a select number of input correlation data points (pixel values). As used herein, "subsampling" is intended to encompass any process by which the resolution of an image is reduced to derive the subsampled data points, e.g., by deriving a reduced amount of digital image data from input image data or by scanning or otherwise deriving image data at the desired reduced resolution relative to an input resolution or relative to a resolution at which the image data would ordinarily be derived for viewing and/or processing.

A step 134 comprises deriving a corresponding source bitmap that is representative of a first one of the source image data files received from the source image database in step 20. Here, again, if the data are already in the desired bitmap format, no further processing is required.

In a step 136, the source bitmap is severely subsampled to obtain a select number of source correlation data points (pixel values) so that an equal number of input correlation data points and source correlation data points are obtained.

In a step 140, the correlation process or calculation is carried out using the input correlation data points and the source correlation data points. A step 142 determines if the source input data file represented by the source bitmap is the source (or one possible source) of the printed input image represented by the input bitmap. If, by the step 142, it is determined that the source data file represented by the source bitmap is not possibly the source of the printed image represented by the input bitmap, a step 144 derives the corresponding source bitmap for the next source image data file in the source image database and the above steps are repeated beginning at step 136.

If, on the other hand, the step 142 determines that the source data file represented by the source bitmap is the source (or one possible source) of the printed input image represented by the input bitmap, the step 40 described above is carried out to identify the source image data file represented by the source bitmap as a "match" data file. At this stage, correlation processing can end so that step 50 is carried out as described above to send data to the output device (OUT) and/or user interface (UI) to prompt the user for input. Alternatively, as indicated by the broken line in FIG. 3, the step 144 is carried out to process further source image data files and source bitmaps in an effort to identify further match data files. Of course, in the case where more than one source image data file is identified as a match or potential match data file with respect to the printed input image, images based upon or representative of these multiple source image data files are displayed to the user in accordance with step 50 described above so that the user can select the desired source image and corresponding source image data file.

The exact nature of the input bitmap and source bitmaps can vary without departing from the overall scope and intent of the present invention, but it is important that they correspond to each other. For example, a single input bitmap can be defined by a concatenation of separate red, green, blue (RGB) separation bitmaps for the input image data. It is important that the source bitmaps be defined in a corresponding manner for the correlation operation to be carried out. Thus, for the foregoing example, the source bitmaps would also be derived by concatenating the red, green, blue (RGB) separation bitmaps for the source image data file in the same manner as was done to derive the input bitmap. Many other methods exist for deriving the input and source bitmaps. In the case of JPEG-compressed data, theses bitmaps can both be defined by the "DC map," i.e., a bitmap of the DC components for each JPEG-compressed image. Further explanation of the DC map is set forth in U.S. Pat. No. 5,838,831 assigned to XEROX CORPORATION, the disclosure of which is hereby expressly incorporated by reference. In some cases, it will be necessary to convert the input image data received from the scanner (SCAN) and/or the source image data received from the database input (DB) to different formats, color spaces, etc., in order to derive corresponding input and source bitmaps, and these conventional operations are contemplated within the scope of the present invention.

It should further be noted that in the case of color images defined by multiple separation bitmaps, e.g., red, green blue (RGB) separations, it is not strictly necessary to concatenate these together to form the input and source bitmaps. An alternative method is to perform the correlation process 140 on corresponding input and source separation bitmap pairs to obtain a correlation result for each corresponding pair of input and source separation bitmaps. These correlation results are then combined into a single correlation result based upon averaging or another method to obtain a single correlation result.

The correlation process 140 can be carried out according to a wide variety of correlation methods. In the preferred embodiment, the correlation process is based upon no more than about 500–1000 input correlation data points (and no more than about 500–1000 source correlation data points). In a most preferred implementation, no more than about 200–300 input correlation data points and source correlation data points are used. Thus, the severe nature of the subsampling operations 132, 136 described above can now be appreciated. For example, in a most preferred example where no more than 200 input and source correlation data points are desired, an input image bitmap defined at a resolution of 1600×1200 pixels is subsampled to obtain only 192 input correlation data points. The source bitmaps are subsampled in a corresponding manner. It is not intended that the invention be limited to any particular subsampling operation. However, as noted, the subsampling operation must be sufficiently aggressive so that no more than 500–1000 data points are obtained and, preferably, no more than about 200–300 data points are obtained for use in the correlation process 140. The severe subsampling described herein is not possible with conventional image finder processes because the conventional methods are used to solve a much broader problem. The present method is able to use the severely subsampled data because it is known or assumed that the source image database actually contains the exact source image data file from which the printed input image was generated. This is true even if the printed input image has been enlarged/reduced.

The correlation process 140 is carried out mathematically on the input and source correlation data points. In a preferred embodiment, N input correlation points Xi' and N source correlation data points Yi' are pre-processed to remove the effects of their own mean and obtain normalized input and source correlation data points Xi, Yi according to the following:

$$Xi = Xi' - \frac{\sum_{i=0}^{N-1} Xi'}{N}$$

$$Yi = Yi' - \frac{\sum_{i=0}^{N-1} Yi'}{N}$$

The normalized input and source correlation data points Xi, Yi are then correlated according to the following:

$$t = \frac{\sum_{i=0}^{N-1} Xi * Yi}{\sqrt{\left(\sum_{i=0}^{N-1} Xi^2\right)\left(\sum_{i=0}^{N-1} Yi^2\right)}}$$

Those of ordinary skill in the art will recognize that the correlation result t will vary between ±1, where a value t=+1 indicates a perfect correlation between the input correlation data points and the source correlation data points, a value t=−1 indicates that the input correlation data points and source correlation data points are exact opposites, and a value t=0 indicates no correlation between the input correlation data points and the source correlation data points.

It has been found that a correlation value t≧0.9 is typically indicative of a source image data file that is an exact match for the printed input image or is at least very similar to source image data file from which the printed image was generated. Thus, using a method in accordance with the present invention, any source image data file that results in a correlation value t≧0.9 is identified as a match data file in steps 40 and 142 described above. Accordingly, in one preferred embodiment, a correlation result value of t≧0.9 is said to be a select threshold that must be met in order to identify a source image data file as a match data file.

The foregoing correlation method has been found to be desirable in that it is less sensitive to brightness and contrast differences between the printed input image and the source images of the source image database as represented by their respective source image data files. Thus, in the case where the printed image has faded or undergone some color-shift over time, the foregoing method results in a better relative comparison between the printed input image and the source images.

Other data matching or comparison methods can be employed in addition to or as an alternative to the foregoing method without departing from the overall scope and intent of the present invention. In one example, N input correlation data points are used while a different number of N' source correlation data points are used in the correlation process. In another example, a correlation result value t can be derived according to the following method:

$$t = \frac{1}{N} * \sum_{i} (Xi - Yi)^2$$

but it should be noted that the input and source correlation data points are not normalized in term of contrast, i.e., the effect of the contrast changes has not been eliminated, and this correlation method is more sensitive to contrast differences between the printed input image and the source images in the source image database as represented by the source image data files. If desired, both of the foregoing correlation methods (or others) can be used together in an effort to obtain the correlation result value t.

The invention has been described with reference to preferred embodiments. Modifications and alterations will occur to those of ordinary skill in the art to which the invention pertains, and it is intended that the invention be construed as encompassing all such modifications and alterations insofar as they are encompassed by the following claims as construed literally or according to the Doctrine of Equivalents.

Having thus described the preferred embodiments, what is claimed is:

1. A method for identifying a source image data file from which a printed image has been generated, said method comprising:
    (a) subsampling input image data to derive input correlation data values related to a printed input image;
    (b) receiving source image data that represent a source image data file stored in a source image database;
    (c) subsampling said source image data to obtain source correlation data values;
    (d) performing a correlation operation between the input correlation values and the source correlation values to obtain a correlation result value (t);
    (e) identifying the source image data file of said source image database as a match data file if a correlation result value (t) associated with said source image data file is greater than or equal to a select threshold.

2. The method as set forth in claim 1, further comprising:
    displaying output data to a user to identify at least one match data file of said source image database from which said printed input image could have been generated.

3. The method as set forth in claim 2, further comprising:
    receiving input from the user by which the user selects a desired source image data file based upon and selected from the at least one match data file identified to said user.

4. The method as set forth in claim 3, wherein said output data displayed to a user is a visual image representative of said at least one match data file.

5. The method as set forth in claim 1, wherein:
    said step of subsampling said input image data to obtain input correlation values comprises deriving N data points from said input image data;
    said step of subsampling said source image data comprises deriving N data points from said source image data; and,
    wherein N≦1000.

6. The method as set forth in claim 5, wherein N≦500.

7. The method as set forth in claim 5, wherein N≦200.

8. The method as set forth in claim 1, wherein said correlation result value (t) of said correlation operation is determined according to:

$$t = \frac{\sum_{i=0}^{N-1} Xi * Yi}{\sqrt{\left(\sum_{i=0}^{N-1} Xi^2\right)\left(\sum_{i=0}^{N-1} Yi^2\right)}}$$

wherein:

$$Xi = Xi' - \frac{\sum_{i=0}^{N-1} Xi'}{N}$$

$$Yi = Yi' - \frac{\sum_{i=0}^{N-1} Yi'}{N}$$

Xi'=the input correlation data values;
Yi'—the source correlation data values;
N=the number of input and source correlation data values;
Xi=normalized input correlation data values;
Yi=normalized source correlation data values.

9. The method as set forth in claim 8, wherein said select threshold against which said correlation result value (t) is compared is 0.9.

10. The method as set forth in claim 1, wherein said input image data are derived from a scanning operation.

11. The method as set forth in claim 1, wherein said step of receiving source image data that represent a source image data files stored in a source image database comprises receiving source image data from a CD-ROM.

12. The method as set forth in claim 1, wherein said steps (b) through (e) are repeated for each of a plurality of different source image data file stored in said source image database.

13. The method as set forth in claim 1, wherein said steps (b) through (e) are repeated only until at least one source image data file is identified as a match data file.

14. An electrophotographic document reproduction apparatus comprising:
   means for identifying a source image data file from which a printed image has been generated, said means for identifying a source image data file comprising:
   (a) means for receiving input image data that represent a printed input image;
   (b) means for subsampling said input image data to derive input correlation data values;
   (c) means for receiving source image data that represent a source image data file stored in a source image database;
   (d) means for subsampling said source image data to obtain source correlation data values;
   (e) means for performing a correlation operation between the input correlation values and the source correlation values to obtain a correlation result value (t);
   (f) means for identifying the source image data file of said source image database as a match data file if a correlation result value (t) associated with said source image data file is greater than or equal to a select threshold.

15. A digital image processing apparatus comprising:
   (a) means for receiving input image data that represent a printed input image;
   (b) means for subsampling said input image data to derive input correlation data values;
   (c) means for receiving source image data that represent a source image data file stored in a source image database;
   (d) means for subsampling said source image data to obtain source correlation data values;
   (e) means for performing a correlation operation between the input correlation values and the source correlation values to obtain a correlation result value (t); and,
   (f) means for identifying the source image data file of said source image database as a match data file if a correlation result value (t) associated with said source image data file is greater than or equal to a select threshold.

16. The digital image processing apparatus as set forth in claim 15, further comprising:
   means for displaying output data to a user to identify at least one match data file of said source image database from which said printed input image could have been generated.

17. The digital image processing apparatus as set forth in claim 16, further comprising:
   means for receiving input from the user by which the user selects a desired source image data file based upon and selected from the at least one match data file identified to said user.

18. The digital image processing apparatus as set forth in claim 15, wherein:
   said means for subsampling said input image data to obtain input correlation data values comprises means for deriving N data points from said input image data, wherein $N \leq 1000$;
   said means for subsampling said source image data to obtain source correlation data values comprises means for deriving N data points from said source image data, wherein $N \leq 1000$.

19. The digital image processing apparatus as set forth in claim 18, wherein $N \leq 500$.

20. The digital image processing apparatus as set forth in claim 15, wherein said means for performing a correlation operation comprise means for deriving said correlation result value (t) according to:

$$t = \frac{\sum_{i=0}^{N-1} Xi * Yi}{\sqrt{\left(\sum_{i=0}^{N-1} Xi^2\right)\left(\sum_{i=0}^{N-1} Yi^2\right)}}$$

wherein:

$$Xi = Xi' - \frac{\sum_{i=0}^{N-1} Xi'}{N}$$

$$Yi = Yi' - \frac{\sum_{i=0}^{N-1} Yi'}{N}$$

Xi'=the input correlation data values;
Yi'—the source correlation data values;
N=the number of input and source correlation data values;
Xi=normalized input correlation data values;
Yi=normalized source correlation data values.

* * * * *